United States Patent [19]

Coleman et al.

[11] 4,439,840

[45] Mar. 27, 1984

[54] REAL-TIME ORDINAL-VALUE FILTERS UTILIZING PARTIAL INTRA-DATA COMPARISONS

[75] Inventors: Guy B. Coleman, Northridge; James W. Henderson, Woodland Hills; Jacob M. Sacks, Thousand Oaks, all of Calif.

[73] Assignee: Hughes Aircraft Company, El Segundo, Calif.

[21] Appl. No.: 306,253

[22] Filed: Sep. 28, 1981

[51] Int. Cl.³ .......................... G06F 7/06; G06F 9/64
[52] U.S. Cl. .................................... 364/900; 382/34; 382/36
[58] Field of Search ... 364/200 MS File, 900 MS File; 382/33, 34, 36, 37; 340/146.2

[56] References Cited

U.S. PATENT DOCUMENTS

| | | | |
|---|---|---|---|
| 2,987,705 | 6/1961 | Van Mechelen | 364/900 |
| 3,336,580 | 8/1967 | Armstrong | 364/900 |
| 3,428,946 | 2/1969 | Batcher | 364/900 |
| 3,444,523 | 5/1969 | Dirks | 364/900 |
| 3,505,653 | 4/1970 | Kautz | 364/900 |
| 3,587,057 | 6/1971 | Armstrong | 364/900 |
| 3,636,519 | 1/1972 | Heath | 364/900 |
| 4,016,549 | 4/1977 | Hutner | 364/900 |
| 4,101,968 | 7/1978 | Florence | 364/900 |
| 4,110,837 | 8/1978 | Chen | 364/900 |
| 4,209,845 | 6/1980 | Berger et al. | 364/900 |

Primary Examiner—Leo H. Boudreau
Attorney, Agent, or Firm—Gerald J. Woloson; Lawrence V. Link; A. W. Karambelas

[57] ABSTRACT

Operating at real-time data rates, hardware logic networks (FIGS. 3–6) receive onto a data-channel array (390 in FIG. 3) a set of unordered input data values and iteratively pair-wise transpose the set members until their positional order on the array coincides with the order the members would assume if their magnitudes were arranged according to sequential ordinal rank. Pair-wise comparisons between the data values themselves provide the basis for the mechanized pair-wise transposition schemes.

Within each network, a key building block for performing both the pair comparisons and member transpositions is a Number Pair Orderer (NPO) (FIG. 2). Each NPO compares (210) two data elements and passes the smaller to one of its outputs (240), while passing the larger to the other of its outputs (260). Individual NPO's are arranged into two groups (311–315 and 321–325), each of which operates iteratively upon pairs of substantially all of the data values. The data-channel array, mechanized in a recirculatory configuration, carries the data back and forth between the two NPO groups. By making the pairs ordered by one NPO group mutually offset from the pairs ordered by the other group, a pair-to-pair transfer of unordered data elements to array positions beyond adjacent channels is accomplished. The recirculatory pair-wise ordering action is complete when the data has passed through the alternate NPO groups a sufficient number of times to enable a maximally-unordered set to be transposed into proper sequence.

The networks become real-time median filters when configured to receive an odd number R of inputs and the ((R+1)/2)nd-largest member of the final ordered set is selected as the overall network output.

5 Claims, 6 Drawing Figures

REAL-TIME ORDINAL-VALUE FILTERS UTILIZING PARTIAL INTRA-DATA COMPARISONS

CROSS-REFERENCE TO RELATED APPLICATIONS

Here incorporated by reference are the disclosures of the following related, copending, common-assignee patent applications: "Real-Time Ordinal-Value Filter Utilizing Reference-Function Comparison," "Real-Time Ordinal-Value Filters Utilizing Complete Intra-Data Comparisons" and "Real-Time Ordinal-Value Filter Utilizing Half-Interval Ranking."

BACKGROUND OF THE INVENTION

1. Field of the Invention

The invention relates in general to signal-processing apparatus and in particular to networks for ordering the values of an input data set and then determining which of the values is the set's Mth-largest. The invention has special relevance in those environments, such as image-processing, where it is advantageous to perform this ordering and value-determination in real time.

2. Description of the Prior Art

Presented here is the concept of an ordinal-value filter which determines which one of a set of R applied data values is the Mth-largest. When R is odd and M is made equal to $((R+1)/2)$, the Mth-largest becomes the "middle" value of the data set, having in general an equal number of other data values both larger than and smaller than itself. Such a middle value is designated the median. A median filter is one which determines or selects this median value from an input data set.

Although both the basic concept of the median filter and its use in the field of image processing are well-known, many prior realizations have depended upon time-consuming software routines Prior-art network concepts capable of being mechanized as hardware-economical, ordinal-value filters which perform the required determinations at the incoming date rate are presented by D. Knuth in Volume 3 of his book, *The Art of Computer Programming: Sorting and Searching* (1973). See especially the odd-even transposition sorting networks given in Knuth's FIG. 58. on page 241.

The filter mechanization presented in FIG. 1 of this specification can be viewed as a hardware-economical, real-time realization of Knuth's odd-even transposition sorting concepts. It should be noted, however, that the inventions claimed in this specification are considered to be patentably different both from Knuth's concepts and from the mechanization of FIG. 1, as well as from the network concepts and mechanizations presented in the incorporated applications.

A real-time ordinal-value-filtering capability is extremely useful, especially, for example, in those situations where the ordinal-value processing of dynamic images is of greatest value when it can be performed as the images are occurring.

SUMMARY OF THE INVENTION

It is an aim of this invention, therefore, to provide apparatus for ordering, as a function of magnitude, a set of applied data values.

It is also an aim of this invention to provide apparatus for determining the Mth-largest value of a set of applied data values.

It is another aim of this invention to provide apparatus for performing such orderings and determinations with a minimum amount of hardware.

It is a further aim of this invention to provide minimum-hardware implementations which can perform such orderings and determinations efficiently in real time.

These and other aims are achieved by the disclosed inventions which in one of their aspects provide hardware logic networks which, operating at real-time data rates, receive onto a data-channel array a set of unordered input data values and iteratively pair-wise transpose the set members until their positional order on the array coincides with the order the members would assume if their magnitudes were arranged according to sequential ordinal rank. Pair-wise comparisions between the data values themselves provide the basis for the mechanized pair-wise transposition schemes. Within each network, a key building block for performing both the pair comparisions and member transpositions is a Number Pair Orderer (NPO). Each NPO compares two data elements and passes the smaller to one of its outputs, while passing the larger to the other of its outputs. Individual NPO's are arranged into two groups, each of which operates iteratively upon pairs of substantially all of the subject data values. The data-channel array, mechanized in a recirculatory configuration, carries the data back and forth between the two NPO groups. By making the pairs ordered by one NPO group mutually offset from the pairs ordered by the other group, a pair-to-pair transfer of unordered data elements to array positions beyond adjacent channels is accomplished. The recirculatory, pair-wise ordering action is complete when the data has passed through the alternate NPO groups a sufficient number of times to enable a maximally-unordered set to be transposed into proper sequence. In another aspect of several of the inventions, the networks become real-time median filters when after applying an odd number R of inputs, the $((R+1)/2)$nd-largest member of the final ordered set is selected as the overall filter output.

BRIEF DESCRIPTION OF THE DRAWINGS

These and other aims and advantages will become apparent from a study of the following specification when considered in conjunction with the accompanying drawings in which.

DETAILED DESCRIPTION OF THE INVENTION

I. Linear Pair-Wise Ordering Network
A. Overview

Figure 1:
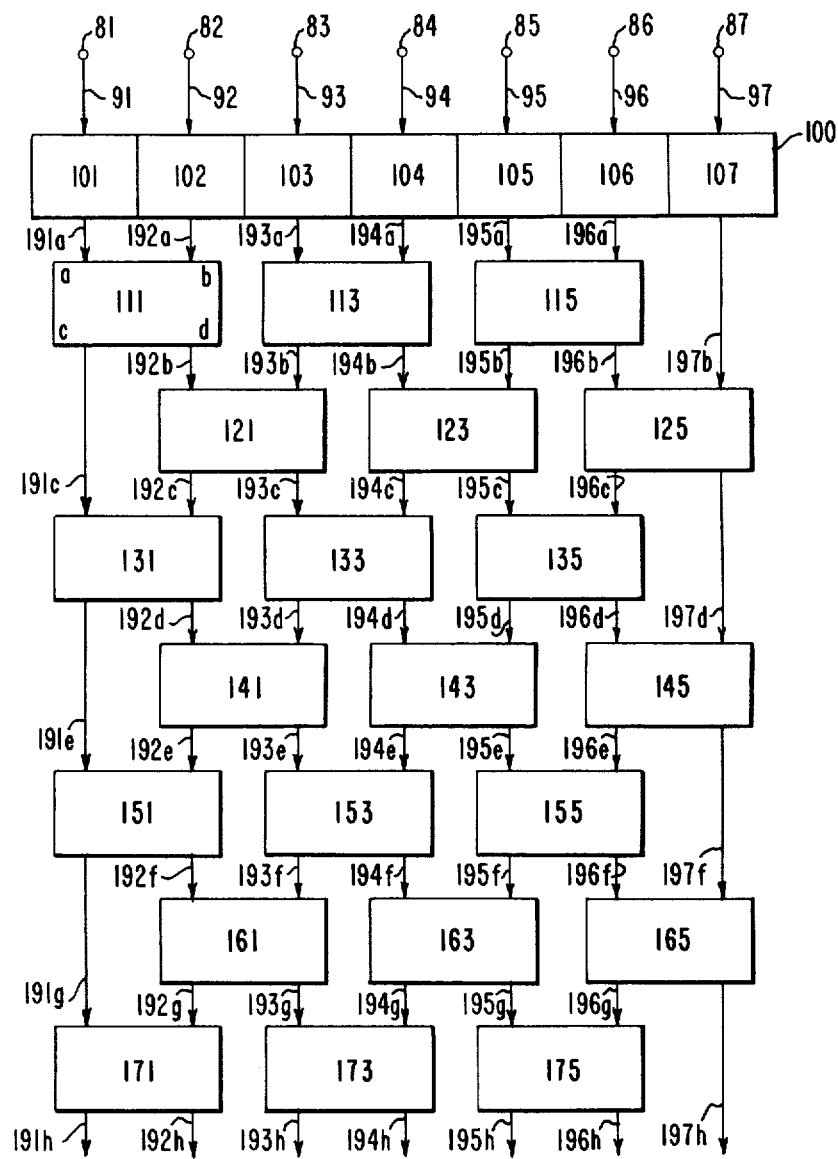
FIG. 1 shows the linear-network implementation of the basic processing concept of pair-wise ordering.

In the illustrative embodiment presented in FIG. 1, a plurality of Number Pair Orderers (NPO's) 111 through 175 receive at channel inputs 191(a) through 197(a) a set of unordered data values from input register 100. The NPO's rearrange these values into a magnitude-ordered data set which appears at channel outputs 191(h) through 197(h), with 191(h) carrying the smallest set value and 197(h) carrying the largest. A desired Mth-largest data-set value is then easily obtained by selecting the value at the Mth output, with the Mth being determined by counting over M output positions beginning with the 197(h) largest.

Each NPO passes to its "d" output the larger of its two inputs, while passing to its "c" output the smaller of the inputs. Operating upon a linear succession of alternating, mutually-offset groups of adjacent pairs of data channels, the NPO's cause the subject values to be shifted back and forth across the array as required to bring them into the desired order at the network's output.

B. Implementation Details for an Odd Number of Data Elements

1. Input Storage Register

Input storage register 100 receives and stores a set of an odd number R of subject data signals. In the example mechanization, R=7 and the individual elements of the signal set are held in subregisters 101 through 107.

As mechanized, the data signals are received at connections 81 through 87 from external sources not shown. In one of many alternatives still encompassed within the inventive concept, subregisters 101 through 107 could themselves be direct-sensing storage elements such as charge-coupled devices, thus eliminating the need for external source connections. Nevertheless, when in fact-derived from external sources in accordance with the depicted example embodiment, the signals are carried over channels 91 through 97 into the respective subregisters.

In another alternative still encompassed within the inventive concept, input register 100 could be a shift register having successive subregisters 101 through 107. Such a register could receive over channel 91 from connection 81 the individual elements of a serially-presented data stream. By means of conventional timing and control devices and techniques, these individual data signals would be made to shift through the successive subregisters as subsequent data-stream elements were received. In this shift-register configuration, the subject data sets whose Mth-largest value is to be determined would be the successive R-unit clusters of data-stream elements as contained in the input register.

Although in a actual filtering system the serial vs. parallel alternatives could produce operational differences, the network's basic filtering action is unaffected by the data's format at register 100's input as long as the data's format at register 100's output is an R-unit set presented in parallel to the Number-Pair-Orderer array described below.

Several parenthetical observations will be noted here. First of all, the overall network is capable of processing either analog or digital data signals, with the principal differences between the two cases being the analog or digital components required for input register 100, for the Number Pair Orderers and for the associated input and interconnection channels.

A second set of observations concerns terminology. In both this and the incorporated specifications, expressions such as "predetermined" are utilized with reference to various entities such as signals and outputs. As so utilized, these expressions are intended to indicate that, even though any one of the available entities is employable for the purpose being discussed, only one at any given time actually is or would be used in the described preferred embodiment or in other mechanizations.

2. Number-Pair-Orderer Array

In its fundamental aspects, the FIG. 1 array is a realization of prior-art sorting concepts, disclosed for example in the above-noted Knuth reference. The array can be considered to establish R parallel data channels 191 through 197 which carry down through the network the individual elements of the subject data set. Segmenting each channel into subchannels (a) through (h) and interposed between pairs of adjacent channels are offset groups of Number Pair Orderers (NPO's) 111 through 175, operating as outlined above. The interposed NPO's together cause the subject data values, originally unordered at input register 100, to be rearranged into a nondecreasing ordered magnitude sequence upon reaching the array output at subchannels 191(h) through 197(h).

3. Number Pair Orderers

Figure 2:
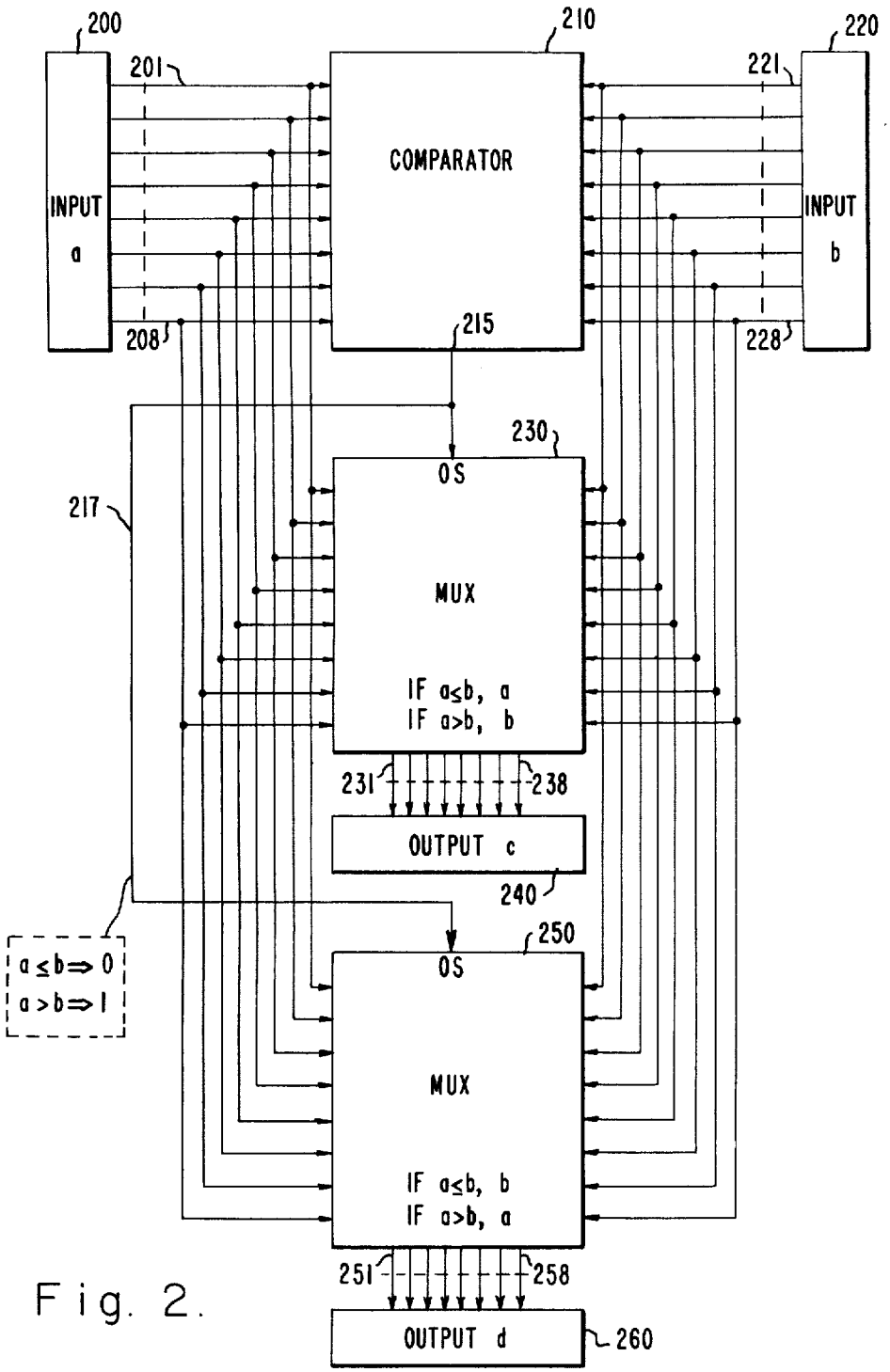
FIG. 2 presents an example mechanization of the Number Pair Orderers used for pair-wise ordering in the FIG. 1 network.

An example digital mechanization for an individual NPO is presented in FIG. 2. The apparatus shown utilizes conventional components to process an illustrative case of 8-bit digital data. The conventional components are a digital comparator 210 and two digital multiplexers 230 and 250. In correspondence with the labeled input and output ports of NPO 111 in FIG. 1, the NPO has input buffers 200 and 220 serving as the "a" and "b" inputs respectively, while output buffers 240 and 260 serve respectively as the "c" and "d" outputs.

Comparator 210 and multiplexers 230 and 250 each receive both the "a" signal and the "b" signal, the "a" signal being brought in to the three devices from buffer 200 by channels 201 through 208, while the "b" signal is brought in from buffer 220 by channels 221 through 228. The comparator compares the magnitudes of the signals presented at its "a" and "b" inputs and produces, as an output-select signal at output 215, a first logic level, which in the implementation may be a logic level "zero," when the "a" signal is less than or equal to the "b" signal. A second logic level, which as implemented may be a logic level "one," is produced otherwise. Channel 217 carries the output logic level to the output select "OS" inputs of both of the multiplexers A "zero" as implemented would cause the first multiplexer 230 to pass the "a" signal onto channels 231 through 238 for transmission to buffer 240 as the NPO's "c" output, and would simultaneously cause the second multiplexer 250 to pass the "b" signal onto lines 251 through 258 for transmission to buffer 260 as the NPO's "d" output. In a similar fashion, the "b" and "a" signals are respectively selected as the "c" and "d" outputs when the comparator output is a "one."

The net effect of the depicted comparisons and signal selections is to produce the desired NPO function of causing the lesser of the "a" and "b" input signals to be transferred to a predetermined one of the "c" and "d" outputs (the "c" output having been configured for this purpose in the illustrated mechanization), while the greater of the two is sent to the illustrated "d" outputs.

C. Implementation Details for an Even Number of Data Elements

General mechanizations for the situations of an even number R of subject data signals would be readily apparent to those skilled in the art. Such mechanizations would correspond to the second and third networks in FIG. 58 on page 241 of the cited Knuth reference.

By including an additional subregister 108 together with seven more NPO's, the network of this application's FIG. 1 could be adapted to process an example case where R=8. The extra subregister would be used to hold the eighth member of the data set, while four of the supplemental NPO's would be used as extensions of alternate NPO groups to order the elements of a now-present present fourth or more generally ((R/2)nd) data pair. The remaining additional NPO's would be configured as an eighth NPO group of NPO's 181, 183 and 185. An eighth (Rth) group would now be needed to complete the ordering of arbitrary eight-element data sets. The groups extended by four of the extra NPO's could be either the first, third, fifth and seventh NPO levels, where the additional components would appear as NPO's 117, 137, 157 and 177, or the second, fourth, sixth and eighth levels where they would be designated 127, 147, 167 and 187.

The extended groups would pair-wise order the signals on all of the data channels, while the non-extended groups would order all channels except for the first and the last. The two unordered "exterior" channels would pass directly from one extended group to the next, where the "next" group would be the network output in the case of the final (eighth-level) extended group.

II. Recirculating Pair-Wise Ordering Networks

A. Overview

Figure 3:
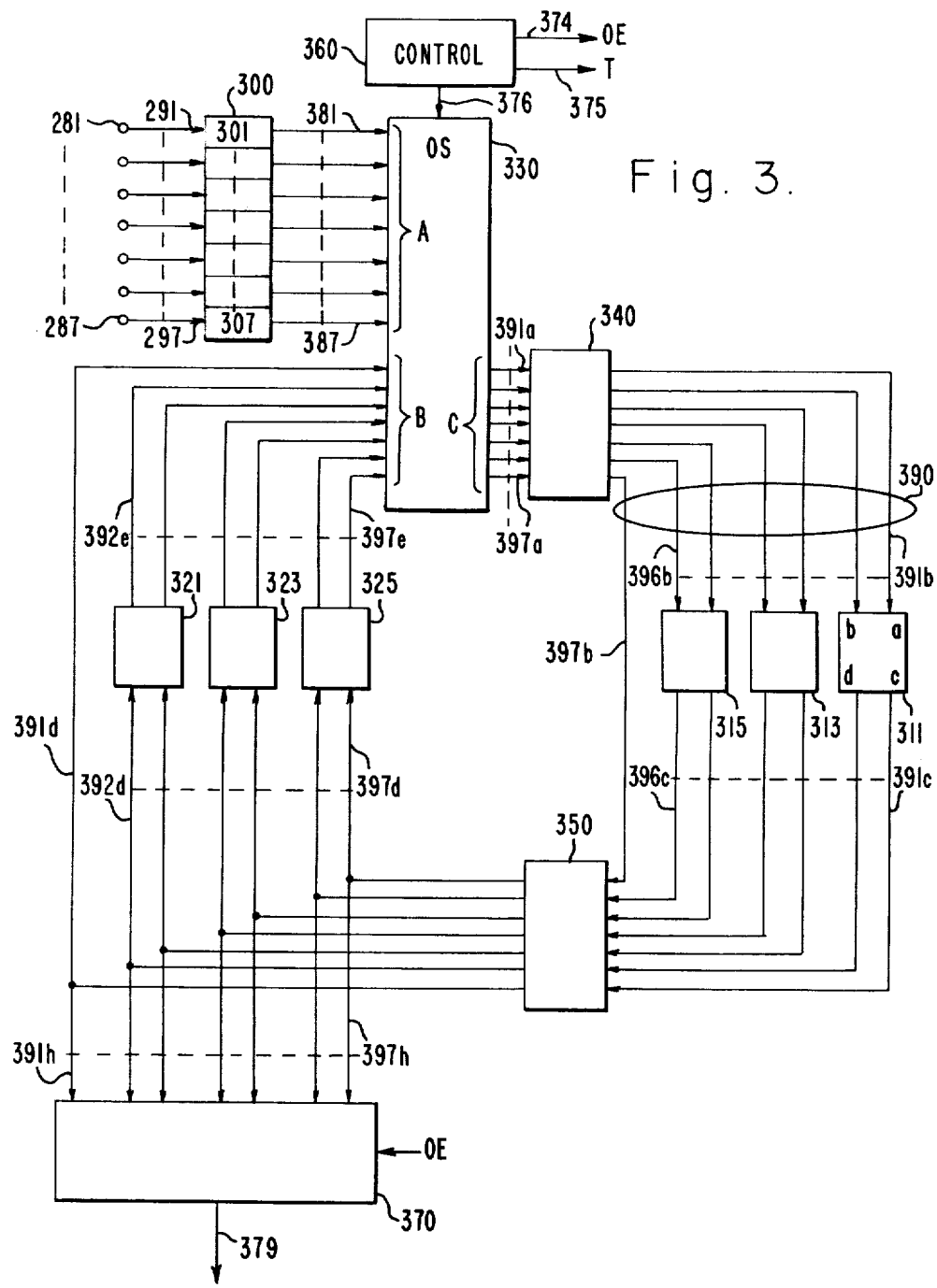
In FIG. 3 an input data set having an odd number of elements is processed by a recirculating arrangement of of NPO groups.

In FIG. 3 is presented an example mechanization of an apparatus whose purpose is to order, as a function of magnitude, a set of R applied data signals, where R is an odd number and where the ordering is accomplished in a plurality of iterative operating cycles. A subject set of R (7 as mechanized) data signals presented to input register 300 is passed by multiplexer 330 into recirculating data channels 391 through 397. Interposed in these channels are a plurality of number pair orderers (NPO's), each of which functions the same as those of FIG. 1. From the multiplexer the values are first carried to an "exterior" NPO group of NPO's 311 through 315, where the values in an "exterior" set of adjacent channels are pair-wise ordered. The values are next sent to an "interior" NPO group of NPO's 321 through 325, where the values in an "interior" set of adjacent channels are pair-wise ordered. After the multiplexer passes the now twice-ordered values through to its "C" outputs, the "exterior-interior" ordering sequence repeats. When the subject data set has been pair-wise ordered R times, the values become arranged into a non-decreasing, ordered-by-magnitude set which appears at output subchannels 391(h) through 397(h), with the smallest value being in subchannel 391(h), while the largest is in subchannel 397(h). A desired Mth-largest value can then easily be selected from the appropriate output subchannel.

B. Implementation Details for an Odd Number of Data Elements

Networks such as the one presented in FIG. 1 are alternately performing only two general types of sorting operations. In each type, data values are being ordered in non-overlapping, adjacent-channel pairs. The two types differ principally in that the channel pairs being ordered by each type are mutually offset. This can be seen in FIG. 1. In that figure the same channel pairs are being ordered by all four of the NPO groups whose first members are NPO's 111, 131, 151 and 171 respectively. Every alternate group operates upon non-overlapping, adjacent-channel pairs which are the same among the alternate group members but which are offset by one channel from the pairs of the other set of groups. With only two sorting operatings being performed both alternately and iteratively, it becomes possible to reduce the network of FIG. 1 to just two groups of comparators which are then connected in a recirculating data configuration. Such a recirculating configuration is shown in FIG. 3.

1. Exterior Alternative a. Input Register

The considerations concerning the previously-described input register 100 apply equally as well to input register 300 and are here incorporated by reference. In particular, register 300 can again alternately be configured for either serial or parallel data in either analog or digital format. Data channels 381 through 387 carry the subject set of R data values from the individual subregisters 301 through 307 to the "A" inputs of multiplexer 330.

b. Recirculatory Subarray

As indicated previously, FIG. 3 represents an example mechanization of an apparatus whose purpose is to order, as a function of magnitude, a set of R applied data signals, where R is an odd number and where the ordering is accomplished in a plurality of iterative operating cycles. Because the example network is configured to process a data set having 7 elements, R=7 for this depicted mechanization.

Figure 4:
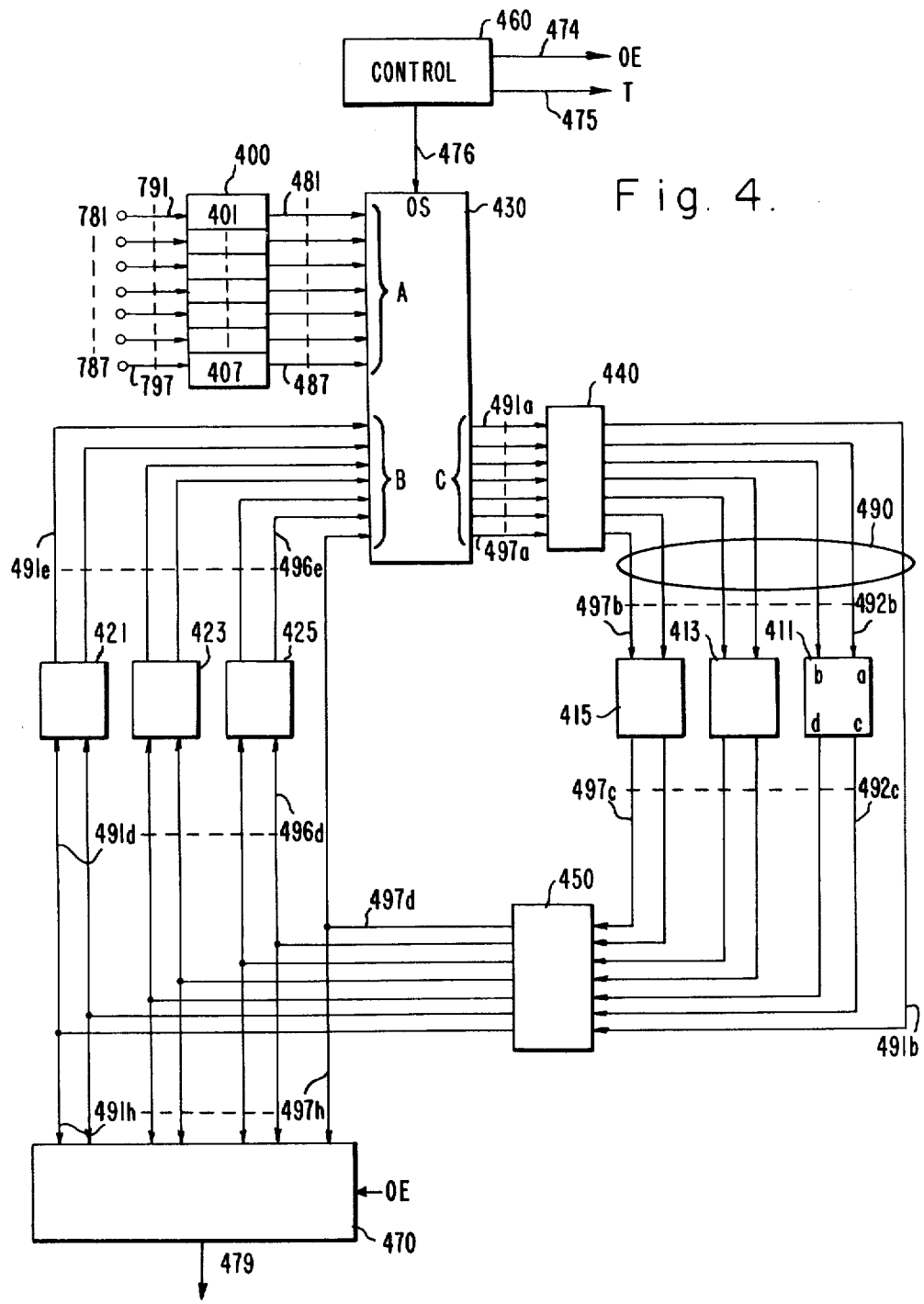
In FIG. 4.is presented an alternative embodiment of the FIG. 3, odd-element recirculatory array.
Figure 5:
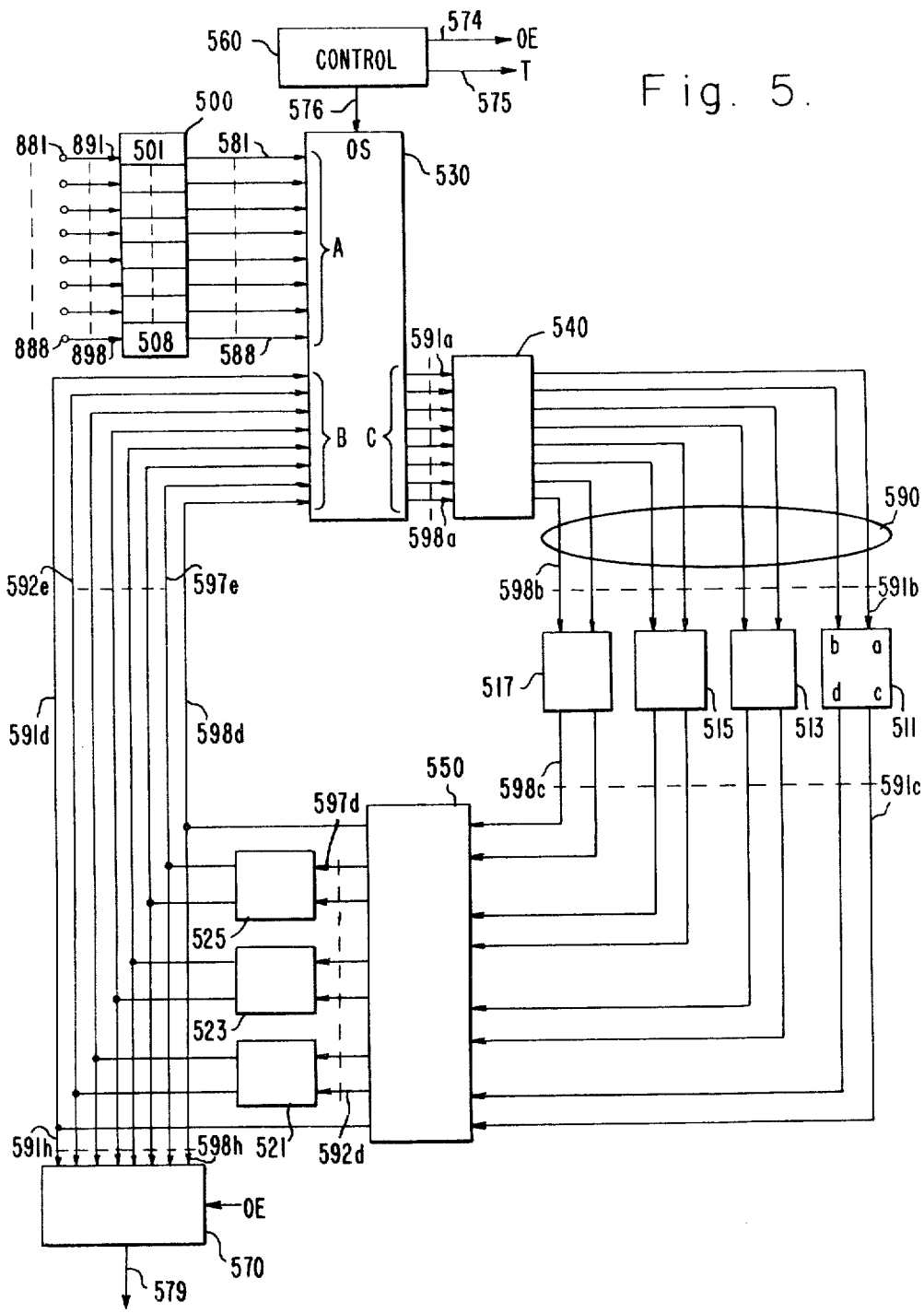
FIGS. 5 and 6 show alternative recirculatory configurations for processing an even number of input data elements.
Figure 6:
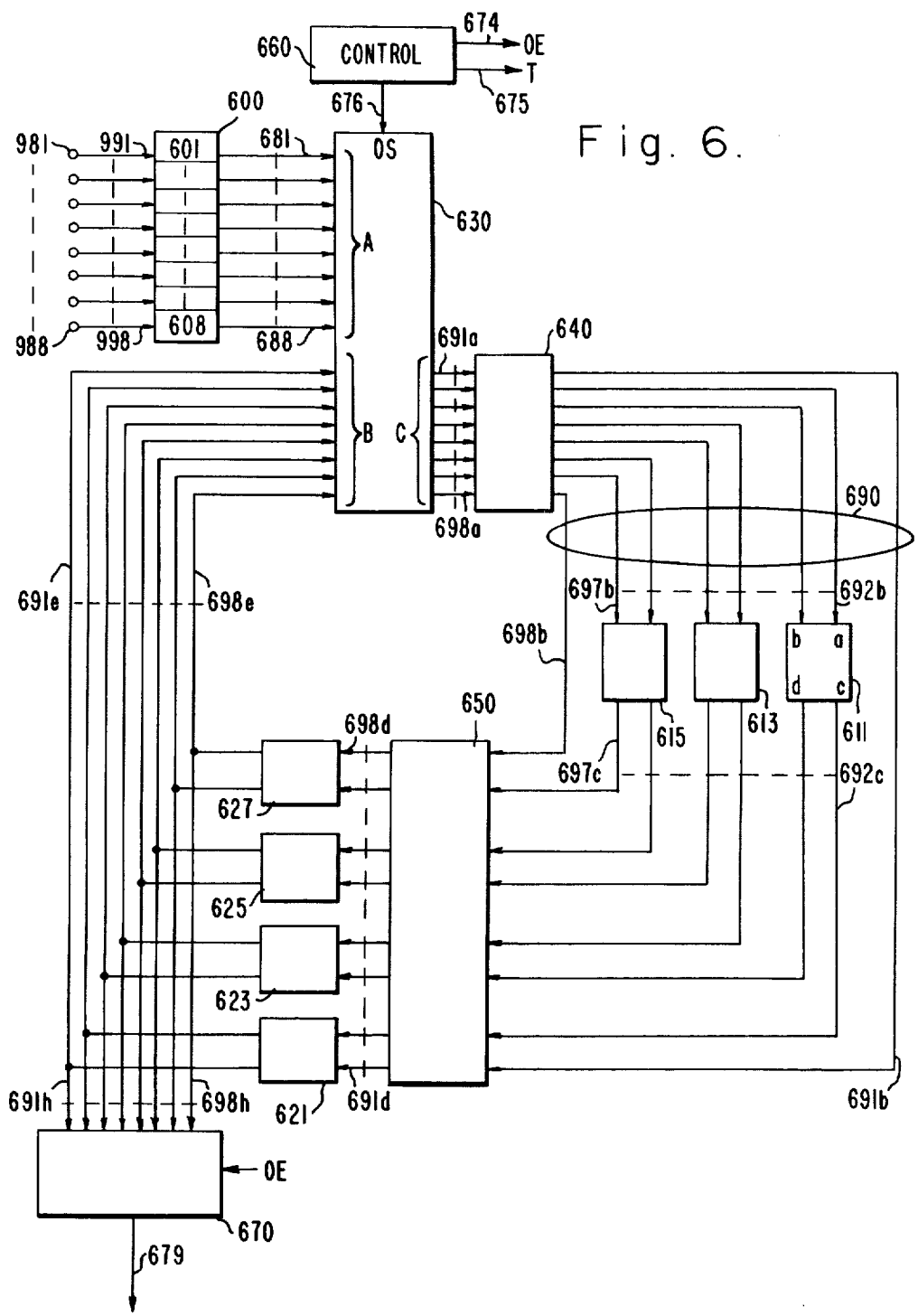

A key feature of the example mechanization is a plurality of Number Pair Orderers (NPO's). The nature of the NPO's used in FIG. 3, as well as those which appear later in FIGS. 4, 5 and 6, is the same as that of those utilized in and described in conjunction with the FIGS. 1 and 2 mechanizations. The applicable descriptive comments made in conjunction with the explanation of those figures are, therefore, here incorporated by reference. In particular, with regard to the example lettering at NPO 311 in FIG. 3, each of the NPO's has a first input "a" and a second input "b," and a first output "c" and a second output "d." These devices are internally configured so as to compare the magnitude of a signal presented at the first, "a" input with the magnitude of a signal presented at the second, "b" input, and thereafter transmit to the predetermined first output "c" that input signal having the smaller relative magnitude, while transmitting to the predetermined other second output "d" that input signal having the greater relative magnitude.

The individual NPO's of the recirculating network are arranged into two groups. The number of NPO's in each group is a function of the size of the set of applied data signals. In the FIG. 3 case of a network which is configured for processing an odd number R of applied data signals, each of the NPO groups has an equal number of ordering devices, this number being ((R−1)/2). These two groups appear in FIG. 3 as a first "exterior" NPO group having NPO's 311, 313 and 315, and as a second "interior" NPO group of NPO's 321, 323 and 325. As an aid in understanding both the interaction between the groups as well as their relationship to the elements of the data set, the individual NPO's of each group are generally identified as a first through ((R−1)/2)nd NPO. In the FIG. 3 case where R=7, NPO',s 311 and 321 become the "first" NPO's of their respective groups, with NPO's 313 and 323 becoming the respective "second" NPO's, while NPO's 315 and 325 become the respective ((R−1)/2)nd or 3rd NPO's.

A recirculating data bus 390 transmits the data signals back and forth between these first and second groups of NPO's during the plurality of iterative operating cycles required for performing the ordering of the input data. As mechanized, bus 390 includes bus-component channels 391 through 397. Each of these channels in turn generally includes subchannels "a" through "h," as will be further described below.

When contained within this data bus while the ordering is being performed, the data is treated as an intermediate signal set whose individual members are designated as first through Rth intermediate signal elements which in the FIG. 3 example mechanization are respectively carried by bus-component channels 391 through 397.

The ordering network also includes a conventional multiplexer 330 having alternate "A" and "B" inputs, and outputs "C." This multiplexer is configured to receive at its "A" inputs over data channels 381 through 387 the subject set of R, originally-unordered, applied data signals, while receiving at its "B" inputs over data-bus subchannels 391(d) and 392(e) through 397(e) the intermediate signal set from the second NPO group of NPO's 321 through 325. Upon receiving at its output-select input "OS" an appropriate conventional command transmitted from conventional control unit 360 over select channel 376, the multiplexer passes to its outputs "C" the signals which appear at either of its "A" or "B" inputs. The conventional control unit 360 is configured to cause the "A" input set of the described applied original data signals to pass to the "C" outputs at the start of the ordering process. Upon being transmitted to the "C" outputs, the applied data signals become an initial first through Rth intermediate signal set. Once the ordering process is under way, the control unit is configured to generate an alternate output-select signal which thereafter transmits to outputs "C" the intermediate results of the ordering process as they appear in intermediate-signal-set form at imputs "B."

From the "C" outputs of multiplexer 330, data bus subchannels 391(a) through 397(a) carry the intermediate signal set to a conventional latch 340 where the data is momentarily stored so as to provide a stable reference for immediately-subsequent processing. From latch 340, bus subchannels 391(b) through 396(b) carry the first through (R−1)st members of the intermediate signal set to the first group of NPO's.

The general concept governing the data-NPO interaction at this point of the network is that within the first NPO group, the individual first through ((R−1)/2)nd NPO's respectively receive and order the ((R−1)/2) successive, non-overlapping signal pairs formed by pair-wise combining the described first through (R−1)st intermediate signals. In the general case of any Jth one of the ((R−1)/2) NPO's, the Jth NPO's first and second inputs respectively receive the ((2×J)−1)st and (2×J)th intermediate signals. The properly-ordered signals transmitted to the first and second outputs of this Jth NPO respectively form the ((2×J)−1)st and (2×J)th elements of a new intermediate signal set. The Rth intermediate signal is left unpaired and unordered by this first group and becomes the Rth element of the new intermediate signal set.

In the FIG. 3 mechanization of these concepts, the first NPO 311 receives the first pair of intermediate signals, the second NPO 313 receives the second pair, and the third NPO 315 receives the third signal pair. Examining the situation where the general NPO designator J equals 2, it can be seen that the second NPO's first and respectively receive the third and fourth intermediate signals. After the pair-wise ordering of these signals, the signals transmitted to this NPO's first and second outputs respectively form the third and fourth elements of the new intermediate signal set which appears on output subchannels 391(c) through 396(c). The seventh signal-set element, carried on subchannel 397(b), is left unordered by this first NPO group and becomes the seventh element of the new intermediate signal set.

The subchannels 391(c) through 396(c) and 397(b) carry the new intermediate signal set to conventional latch 350 where the new set is momentarily stored so as to again provide a stable reference for immediately-subsequent processing. From the output of this latch, subchannels 392(d) through 397(d) carry the new intermediate signal set to the second group of NPO's, while subchannel 391(d) carries the first signal-set element to the "B" inputs of multiplexer 330.

At the (d) subchannel outputs of the latch, all set members are carried by output subchannels 391(h) through 397(h) to conventional output multiplexer 370. As further explained below, after an appropriate number of ordering iterations, control unit 360 generates on channel 374 an output-enable command "OE" which upon being received by multiplexer 370 permits any one of the multiplexer's R input signals to be transmitted from the network on output channel 379 as a desired Mth-largest output from the overall system.

The general concept governing the data-NPO interaction at the second NPO group is that within this group, the individual first through ((R−1)/2)nd NPO's respectively receive and order the ((R−1)/2) successive, non-overlapping signal pairs formed by pair-wise combining the second through Rth intermediate signals. In the general case of any Jth one of the ((R−1)/2) NPO's, the Jth NPO,s first and second inputs respectively receive the (2×J)th and ((2×J)+1)st intermediate signals. The properly-ordered signals transmitted to the first and second outputs of this Jth NPO respectively form the (2×J)th and ((2×J)+1)st elements of a new intermediate signal set. The first intermediate signal is left unpaired and unordered by this second group and becomes the first element of the new intermediate signal set.

In the FIG. 3 mechanization of these concepts, the first NPO 321 receives the first pair of intermediate signals, the second NPO 323 receives the second pair, and the third NPO 325 receives the third signal pair. Examining the situation where the general NPO designator J equals 2, it can be seen that the second NPO's first and second inputs respectively receive the fourth and fifth intermediate signals. After the pair-wise ordering of these signals, the signals transmitted to this NPO's first and second outputs respectively form the fourth and fifth elements of the new intermediate signal set which appears on output subchannels 392(e) through 397(e). The first signal set element, carried on subchannel 391(d), is left unordered by this second NPO group and becomes the first element of the new intermediate signal set. The subchannels 392(e) through 397(e), together with subchannel 391(d), carry the new intermediate signal set back to the "B" inputs of the multiplexer 330, at which point the now partially-ordered data is ready for the next ordering iteration.

Control unit 360 sends over timing bus 375 the set "T" of conventional timing control signals required to cause the data to circulate around the loop during the ordering process. The individual timing elements of the set "T" are received at the individual array devices by means of conventional connections not shown. As it is considered to be readily apparent to those skilled in the art that the design of such timing signals would be a relatively straightforward task, a detailed description of an example set of such timing signals will be dispensed with. It is believed sufficient to state that the timing signals are sequenced so that the data is subjected to a total of R group orderings before the output enable signal "OE" is generated. This requirement is in accordance with the general theory of sorting operation apparent from the network of FIG. 1 and from the previously-cited teachings of Knuth, where the data is properly ordered after having passed through R levels of ordering. In the FIG. 3 network, the data will have experienced the required odd number R of orderings after having passed $((R+1)/2)$ times through the first NPO group of NPO's 311, 313 and 315. Thus, the output new intermediate signal set from the first group becomes the properly-ordered desired magnitude sequence after the $((R+1)/2)$nd cycle of data signals through this first group. Because the data is properly ordered after this cycle, further orderings are unnecessary, and the output multiplexer is attached between the first and second NPO groups. It will be seen below that this is in contradistinction to the networks of FIGS. 5 and 6 where, for an even number R of data values, the output appears, after an appropriate number of orderings, at the output of the second NPO group.

2. Interior Alternative

The recirculartory network of FIG. 4 is substantially equivalent to that of FIG. 3 except for the relative intra-bus positions of the two NPO groups. While the first and second groups of the FIG. 3 array respectively order the data values carried on the first through $(R-1)$st and second through Rth bus channels, those of FIG. 4 conversely order the second through Rth and first through $(R-1)$st respectively. It is thus apparent that many of the descriptive comments made concerning the array of FIG. 3 are relevant to the array of FIG. 4 and are, therefore, here generally incorporated by reference. At the same time, however, the previously-presented description will in the following paragraphs be particularized with respect to the FIG. 4 configuration.

a. Input Register

Just as with the input register 300 of FIG. 3, the considerations concerning the previously-described input register 100 apply to input register 400 and are here incorporated by reference. In particular, register 400 can again alternately be configured for either serial or parallel data in either analog or digital format. Data channels 481 through 487 carry the subject set of R data values from the individual subregisters 401 through 407 to the "A" inputs of multiplexer 430.

b. Recirculatory Subarray

FIG. 4, like FIG. 3, represents an example mechanization of an apparatus whose purpose is to order, as a function of magnitude, a set of R applied data signals, where R is an odd number and where the ordering is accomplished in a plurality of iterative operating cycles. Because the example network is configured to process a data set having 7 elements, R=7 for this depicted mechanization.

A key feature of the example mechanization is a plurality of Number Pair Orderers (NPO's). The nature of the NPO's used in FIG. 4 is the same as that of those utilized in and described in conjunction with the FIGS. 1 and 2 mechanizations. The applicable descriptive comments made with regard to the explanation of those figures are, therefore, here incorporated by reference. In particular, with respect to the example lettering at NPO 411 in FIG. 4, each of the NPO's has a first input "a" and a second input "b," and a first output "c" and a second output "d." These devices are internally configured so as to compare the magnitude of a signal presented at the first, "a" input with the magnitude of a signal presented at the second, "b" input, and thereafter transmit to the predetermined first output "c" that input signal having the smaller relative magnitude, while transmitting to the predetermined second output "d" that input signal having the greater relative magnitude.

As with FIG. 3, the individual NPO's of the FIG. 4 recirculating network are arranged into two groups. The number of NPO's in each group is a function of the size of the set of applied data signals. In the FIG. 4 case of a network which is configured for processing an odd number R of applied data signals, each of the NPO groups has an equal number of ordering devices, this number being $((R-1)/2)$. In contrast to the FIG. 3 "exterior"/"interior" alternative, these two NPO groups appear in FIG. 4 as a first "interior" NPO group having NPO's 411, 413 and 415, and as a second "exterior" NPO group of NPO's 421, 423 and 425. As an aid in understanding both the interaction between the groups as well as their relationship to the elements of the data set, the individual NPO's of each group are generally identified as a first through $((R-1)/2)$nd NPO. In the FIG. 4 case where R=7, NPO's 411 and 421 become the "first" NPO's of their respective groups, with NPO's 413 and 423 becoming the respective "second" NPO's, while NPO's 414 and 425 become the respective $((R-1)/2)$nd or 3rd NPO's.

The recirculating data bus 490 transmits the data signals back and forth between these first and second groups of NPO's during the plurality of iterative operating cycles required for performing the ordering of the input data. As mechanized, bus 490 includes bus-component channels 491 through 497. Each of these channels in turn generally includes subchannels "a" through "h," as will be further described below.

When contained within this data bus while the ordering is being performed, the data is treated as an intermediate signal set whose individual members are designated as first through Rth intermediate signal elements which in the FIG. 4 example mechanization are respectively carried by bus-component channels 491 through 497.

The ordering network also includes a conventional multiplexer 430 having alternate "A" and "B" inputs, and outputs "C." This multiplexer is configured to receive at its "A" inputs over data channels 481 through 487 the subject set of R, originally-unordered, applied data signals, while receiving at its "B" inputs over data-bus subchannels 491(e) through 496(e) and 497(d) the intermediate signal set from the second NPO group of NPO's 421 through 425. Upon receiving at its output-select input "OS" an appropriate conventional command transmitted from conventional control unit 460 over select channel 476, the multiexer passes to its outputs "C" the signals which appear at either of its "A" or "B" inputs. The conventional control unit 460 is configured to cause the "A" input set of the described applied original data signals to pass to the "C" outputs at the start of the ordering process. Upon being transmitted to the "C" outputs, the applied data signals become an initial first through Rth intermediate signal set. Once the ordering process is under way, the control unit is configured to generate an alternate output-select signal which thereafter transmits to outputs "C" the intermediate results of the ordering process as they appear in intermediate-signal-set form at inputs "B."

From the "C" outputs of multiplexer 430, data bus subchannels 491(a).- through 497(a) carry the intermediate signal set to a conventional latch 440 where the data is momentarily stored so as to provide a stable reference for immediately-subsequent processing. From latch 440, bus subchannels 492(b) through 497(b) carry the second through Rth members of the intermediate signal set to the first group of NPO's.

The general concept governing the data-NPO interaction at this point of the network is that within the first NPO group, the individual first through $((R-1)/2)$nd NPO's respectively receive and order the $((R-1)/2)$ successive, non-overlapping signal pairs formed by pair-wise combining the described second through Rth intermediate signals. In the general case of any Jth one of the $((R-1)/2)$ NPO's, the Jth NPO's first and second inputs respectively receive the $(2 \times J)$th and $((2 \times J)+1)$st intermediate signals. The properly-ordered signals transmitted to the first and second outputs of this Jth NPO respectively form the $(2 \times J)$th and $((2 \times J)+1)$st elements of a new intermediate signal set. The first intermediate signal is left unpaired and unordered by this first group and becomes the first element of the new intermediate signal set.

In the FIG. 4 mechanization of these concepts, the first NPO 411 receives the first pair of intermediate signals, the second NPO 413 receives the second pair, and the third NPO 415 receives the third signal pair. Examining the situation where the general NPO designator J equals 2, it can be seen that the second NPO's first and second inputs respectively receive the fourth and fifth intermediate signals. After the pair-wise ordering of these signals, the signals transmitted to this NPO's first and second outputs respectively form the fourth and fifth elements of the new intermediate signal set which appears on output subchannels 492(c) through 497(c). The first signal set element, carried on subchannel 491(b), is left unordered by this first NPO group and becomes the first element of the new intermediate signal set.

The subchannels 492(c) through 497(c), together with 491(b), carry the new intermediate signal set to conventional latch 450 where the new set is momentarily stored so as to again provide a stable reference for immediately-subsequent processing. From the output of this latch, subchannels 491(d) through 496(d) carry the new intermediate signal set to the second group of NPO's, while subchannel 497(d) carries the Rth signal set element to the "B" inputs of multiplexer 430.

At the (d) subchannel outputs of the latch, all set members are carried by output subchannels 491(h) through 497(h) to conventional output multiplexer 470. As further explained below, after an appropriate number of ordering iterations, control unit 460 generates on channel 474 an output-enable command "OE" which upon being received by multiplexer 470 permits any one of the multiplexer's R input signals to be transmitted from the network on output channel 479 as a desired Mth-largest output from the overall system.

The general concept governing the data-NPO interaction at the second NPO group is that within this group, the individual first through $((R-1)/2)$nd NPO's respectively receive and order the $((R-1)/2)$ successive, non-overlapping signal pairs formed by pair-wise combining the first through $(R-1)$st intermediate signals. In the general case of any Jth one of the $((R-1)/2)$ NPO's, the Jth NPO's first and second inputs respectively receive the $((2 \times J)-1)$st and $(2 \times J)$th intermediate signals. The properly-ordered signals transmitted to the first and second outputs of this Jth NPO respectively form the $((2 \times J)-1)$st and $(2 \times J)$th elements of a new intermediate signal set. The Rth intermediate signal is left unpaired and unordered by this second group and becomes the Rth element of the new intermediate signal set.

In the FIG. 4 mechanization of these concepts, the first NPO 421 receives the first pair of intermediate signals, the second NPO 423 receives the second pair, and the third NPO 425 receives the third signal pair. Examining the situation where the general NPO designator J equal 2, it can be seen that the second NPO's first and second inputs respectively receive the third and fourth intermediate signals. After the pair-wise ordering of these signals, the signals transmitted to this NPO's first and second outputs respectively form the third and fourth elements of the new intermediate signal set which appears on output subchannels 491(e) through 496(e). The seventh signal-set element, carried on subchannel 497(d), is left unordered by this second NPO group and becomes the seventh element of the new intermediate signal set.

The subchannels 491(e) through 496(e), together with subchannel 497(d), carry the new intermediate signal set back to the "B" inputs of the multiexer 430, at which point the now partially-ordered data is ready for the next ordering iteration.

Control unit 460 sends over timing bus the set "T" of conventional timing control signals required to cause the data to circulate around the loop during the ordering process. The individual timing ements of the set T are received at the individual array devices by means of conventional connections not shown. As it is considered to be readily apparent to those skilled in the art that the design of such timing gnals would be a relatively straightforward task, a detailed description of an example set of such timing signals will be dispensed with. It is believed sufficient to state that the timing signals are sequenced so that the data is subjected to a total of R group orderings before the output enable signal "OE" is generated. This requirement is in accordance with the general theory of sorting operation apparent from the network of FIG. 1 and from the previously-cited teachings of Knuth, where the data is properly ordered after having passed through R levels of ordering. In the FIG. 4 network, the data will have experienced the required odd number R of orderings after having passed $((R+1)/2)$ times through the first NPO group of NPO's 411, 413 and 415. Thus, the output new intermediate signal set from the first group becomes the properly-ordered desired magnitude sequence after the $((R+1)/2)$nd cycle of data signals through this first group. Because the data is properly ordered after this cycle, further orderings are unnecessary, and the output multiplexer is attached between the first and second NPO groups. As mentioned previously, it will be seen below that this is in contradistinction to the networks of FIGS. 5 and 6 where, for an even number R of data values, the output appears, after an appropriate number of orderings, at the output of the second NPO group.

C. Implementation Details for an Even Number of Data Elements

Recirculatory mechanizations corresponding to networks of FIGS. 3 and 4 but configured for processing data sets having an even number R of elements are presented in FIGS. 5 and 6. It will be apparent to those skilled in the art that in their general aspects the example mechanizations of FIGS. 5 and 6 are similar to those of FIGS. 3 and 4. As a result, many of the descriptive comments concerning the nature, structure and operation of the Figures-3 and 4 networks are directly applicable to the networks of FIGS. 5 and 6 and are here incorporated by reference.

The principal differences concern the number of input values and the resulting number and configuration of data bus channels and NPO's. In particular, data buses 590 and 690 have an even number R of bus-component channels, NPO's 511 through 517 of FIG. 5 and NPO's 621 through 627 of FIG. 6 are now "all-pair" NPO groups, and "partial-pair" groups comprise NPO's 521 through 525 in FIG. 5 and NPO's 611 through 615 in FIG. 6. (It can be seen that the networks of FIGS. 5 and 6 are themselves substantially the same except for the relative positions of these "all-pair" and "partial-pair" groups.) In both of these FIGS., the properly-ordered data values appear, after an appropriate number of iterations, at the output of the second NPO group, instead of after an appropriate number of iterations at the output of the first NPO group as was the case for the networks of FIGS. 3 and 4.

1. All-Pair Alternative a. Overview

More specifically, in FIG. 5 is presented an example mechanization of an apparatus whose purpose s to order, as a function of magnitude, a set of R applied data signals, where R is an even number and where the ordering is accomplished in a plurality of iterative operating cycles. A subject set of R (as mechanized, 8) data signals presented to input register 500 is passed by multiplexer 530 into recirculating data channels 591 through 598. Interposed in these channels are a plurality of Number Pair Orderers (NPO's), each of which functions the same as those of FIG. 1. From the multiplexer the values are first carried to an "all-pair" NPO group of NPO's 511 through 517, where the values in an "all-pair" set of adjacent channels are pair-wise ordered. The values are next sent to a "partial-pair" NPO group of NPO's 521 through 525, where the values in an "partial-pair" set of adjacent channels are pair-wise ordered. After the multiplexer passes the now twice-ordered values through to its "C" outputs, the "all/partial" ordering sequence repeats. When the subject data set has been pair-wise ordered R times, the values become arranged into a non-decreasing, ordered-by-magnitude set which appears at output subchannels 591(h) through 598(h), with the smallest value being in subchannel 591(h), while the largest is in subchannel 598(h). A desired Mth-largest value can then easily be selected from the appropriate output subchannel.

b. Input Register

The considerations concerning the previously-described input registers 100, 300 and 400 apply equally as well to input register 500 and are here incorporated by reference. In particular, the input register 500 may again alternatively be configured for either serial or parallel data in either analog or digital format. Data channels 581 through 588 carry the subject set of R data values from the individual subregisters 501 through 508 to the "A" inputs of multiplexer 530.

c. Recirculatory Subarray

As indicated previously, FIG. 5 presents an example mechanization for an apparatus whose purpose is to order, as a function of magnitude, a set of R applied data signals, where R is an even number, and where the ordering is accomplished in a plurality of iterative operating cycles. Because the example network is configured to process a data set having 8 elements, R=8 for this depicted mechanization.

As with the networks of previous FIGS., a key feature of the FIG. 5 example mechanization is a plurality of Number Pair Orderers (NPO's). The nature of the NPO's used in FIG. 5 is the same as that of those utilized in the Figures-1 and 2 mechanizations and presented and described in detail in conjunction with those FIGS. The applicable descriptive comments made in connection with the explanation of FIGS. 1 and 2, are therefore, here again incorporated by reference. In particular, with reference to the example lettering at NPO 511 in FIG. 5, each of the NPO's has a first input "a" and a second input "b," and a first output "c" and a second output "d." These devices are internally configured so as to compare the magnitude of a signal presented at the first "a" input with the magnitude of a signal presented at the second "b" input, and thereafter transmit to the predetermined first output "c" that input signal having the smaller relative magnitude, while transmitting to the predetermined other second output "d" that input signal having the greater relative magnitude.

The individual NPO's of this recirculating network are arranged into two groups. The number of NPO's in each group is a function of the size of the set of applied data signals. In the FIG. 5 case of a network which is configured for processing an even number R of applied data signals, one of the NPO groups has (R/2) ordering devices, while the other group has ((R/2)−1). These two groups appear in FIG. 5 as a first, "all-pair" NPO group having NPO's 511, 513, 515 and 517, and as a second, "partial-pair" NPO group of NPO's 521, 523 and 525. As an aid in understanding both the interaction between the groups as well as their relationship to the elements of the data set, the individual NPO's of the first group are generally identified as a first through (R/2)nd NPO, while those of the second group are generally identified as a first through ((R/2)−1)st NPO. In the FIG. 5 case where R=8, NPO's 511 and 521 become the "first" NPO's of their respective groups, with NPO's 513 and 523 become the respective "second" NPO's, while NPO's 515 and 525 become the respective ((R/2)−1)st or "third" NPO's. NPO 517 becomes the sole "fourth" NPO of the network.

A recirculating data bus 590 transmits the data signals back and forth between these first and second groups of NPO's during the plurality of iterative operating cycles required for performing the ordering of the input data. As mechanized, bus 590 includes bus-component channels 591 through 598. Each of these channels in turn generally includes subchannels "a" through "h," as will be further described below.

When contained within this data bus while the ordering is being performed, the data is treated as an intermediate signal set whose individual members are designated as a first through Rth intermediate signal element which in the FIG. 5 example mechanization are respectively carried by bus-component channels 591 through 598.

The ordering network also includes a conventional multiplexer 530 having alternate "A" and "B" inputs, and outputs "C." This multiplexer is configured to receive at its "A" inputs over data channels 581 through 588 the subject set of R, originally-unordered, applied data signals, while receiving at its "B" inputs, over data-bus subchannels 591(d), 592(e) through 597(e), and 598(d), the intermediate signal set generated at the second NPO group of NPO's 521 through 525. Upon receiving at its output-select input "OS" an appropriate command from conventional control unit 560, the multiplexer passes to its outputs "C" the signals which appear at either of its "A" or "B" inputs. The conventional control unit 560 is configured to cause the "A" input set of the described applied original data signals to pass to the "C" outputs at the start of the ordering process. Upon being transmitted to the "C" outputs, the applied data signals become an initial first through Rth intermediate signal set. Once the ordering process is under way, the control unit is configured to generate an alternate output-select signal which thereafter transmits to outputs "C" the intermediate results of the ordering process as they appear in intermediate-signal-set form at inputs "B."

From the "C" outputs of multiplexer 530, data bus subchannels 591(a) through 598(a) carry the intermediate signal set to a conventional latch 540 where the data is momentarily stored so as to provide a stable reference for immediately-subsequent processing.

From latch 540, bus subchannels 591(b) through 598(b) carry all R members of the intermediate signal set to the first group of NPO's.

The general concept governing the data-NPO interaction at this point of the network is that within the first NPO group, the individual first through (R/2)nd NPO's respectively receive and order the (R/2) successive, non-overlapping signal pairs formed by pair-wise combining the first through Rth intermediate signals. In the general case of any Jth one of the (R/2) NPO's, the Jth NPO's first and second inputs respectively receive the $((2 \times J) - 1)$st and $(2 \times J)$th intermediate signals. The properly-ordered signals transmitted to the first and second outputs of this Jth NPO respectively form the $((2 \times J) - 1)$st and $(2 \times J)$th elements of a new intermediate signal set.

In the FIG. 5 mechanization of these concepts, the first NPO 511 receives the first pair of intermediate signals, the second NPO 513 receives the second pair, the third NPO 515 receives the third signal pair and the fourth NPO 517 receives the fourth signal pair. Examining the situation where the general NPO designator J equals 2, it can be seen that the second NPO's first and second inputs respectively receive the third and fourth intermediate signals. After the pairwise ordering of these signals, the signals transmitted to this NPO's first and second outputs respectively form the third and fourth elements of the new intermediate signal set which appears on output subchannels 591(c) through 598(c).

The subchannels 591(c) through 598(c) carry the new intermediate signal set to conventional latch 550 where the new set is momentarily stored so as to again provide a stable reference for immediately-subsequent processing. From the output of this latch, subchannels 592(d) through 597(d) carry the new intermediate signal set to the second group of NPO's, while subchannels 591(d) and 598(d) carry the first and Rth signal set elements back to multiplexer 530.

The general concept governing the data-NPO interaction at the second NPO group is that within this second group, the individual first through $((R/2) - 1)$st NPO's respectively receive and order the $((R/2) - 1)$ successive, non-overlapping signal pairs formed by pair-wise combining the second through (R − 1)st intermediate signals. In the general case of any Jth one of the $((R/2) - 1)$ NPO's, the Jth NPO's first and second inputs respectively receive the $(2 \times J)$th and $((2 \times J) + 1)$st intermediate signals. The properly-ordered signals transmitted to the first and second outputs of this Jth NPO respectively form the $(2 \times J)$th and $((2 \times J) + 1)$st elements of a new intermediate signal set. The first and Rth intermediate signals are left unpaired and unordered by this second group and become the first and Rth elements of the new intermediate signal set.

In the FIG. 5 mechanization of these concepts, the first NPO 521 receives the first pair of intermediate signals, the second NPO 523 receives the second pair, and the third NPO 525 receives the third signal pair. Examining the situation where the general NPO designator J equals 2, it can be seen that the second NPO's first and second inputs respectively receive the fourth and fifth intermediate signals. After the pair-wise ordering of these signals, the signals transmitted to this NPO's first and second outputs respectively form the fourth and fifth elements of the new intermediate signal set which appears on output subchannels 592(e) through 597(e). The first and eighth signal-set elements, carried on subchannels 591(d) and 598(d), are left unordered by this second NPO group and become the first and eighth elements of the new intermediate signal set.

The subchannels 592(e) through 597(e), together with subchannels 591(d) and 598(d), carry the new intermediate signal set back to the "B" inputs of multiplexer 530, at which point the now partially-ordered data is ready for the next ordering iteration. From subchannels 591(d), 598(d) and 592(e) through 597(e), all set members are carried by output subchannels 591(h) through 598(h) to conventional output multiplexer 570. As further explained below, after an appropriate number of ordering iterations, control unit 560 generates on channel 574 an output-enable command "OE" which upon being received by multiplexer 570 permits any one of the multiplexer's R input signals to be transmitted from the network on output channel 579 as a desired Mth-largest output from the overall system.

Control unit 560 sends out over timing bus 575 the set "T" of conventional timing control signals required to cause the data to circulate around the loop during the ordering process. The individual timing elements of the set "T" are received at the individual array devices by means of conventional connections not shown. As it is considered to be readily apparent to those skilled in the art that the design of such timing signals would be a relatively straightforward task, a detailed description of an example set of such timing signals will be dispensed with. It is believed sufficient to state that the timing signals are sequenced so that the data is subjected to a total of R group orderings before the output enable signal "OE" is generated. This requirement is in accordance with the general theory of sorting operation apparent from the network of FIG. 1 and from the previously-cited teachings of Knuth, where the data is properly ordered after having passed through R levels of ordering. In the FIG. 5 network, the data will have experienced the required R orderings after having passed (R/2) times through both NPO groups. Thus, the output new intermediate signal set from the second group becomes the properly-ordered desired magnitude sequence after the (R/2)nd cycle of data signals through this second group. Because the data is properly ordered after this cycle, further orderings are unnecessary, and the output multiplexer is attached after both the first and second NPO groups. This is in contradistinction to the networks of FIGS. 3 and 4 where the output appears, after an appropriate number of orderings, at the output of the first NPO group.

2 Partial-Pair Alternative a. Overview

In FIG. 6 is presented an example mechanization of an apparatus whose purpose is to order, as a function of magnitude, a set of R applied data signals, where R is an even number and where the ordering is accomplished in a plurality of iterative operating cycles. A subject set of R (as mechanized, 8) data signals presented to input register 600 is passed by multiplexer 630 into recirculating data channels 691 through 698. Interposed in these channels are a plurality of Number Pair Orderers (NPO's), each of which functions the same as those of FIG. 1. From the multiplexer the values are first carried to a "partial-pair" group of NPO's 611 through 615, where the values in a "partial- = =pair" set of adjacent channels are pair-wise ordered. The values are next sent to an "all-pair" NPO group of NPO's 621 through 627, where the values in an "all-pair" set of adjacent channels are pair-wise ordered. After the multiplexer passes the now twice-ordered values through to its "C" outputs, the "partial/all" ordering sequence repeats When the subject data set has been pair-wise ordered R times, the values become arranged into a non-decreasing, ordered-by-magnitude set which appears at output subchannels 691(h) through 698(h), with the smallest value being in subchannel 691(h), while the largest is in subchannel 698(h). A desired Mth-largest value can then easily be selected from the appropriate output subchannel.

3. Input Register

The considerations concerning the previously-described input registers 100, 300, 400 and 500 apply equally as well to input register 600 and are here incorporated by reference. In particular, the input register 600 can again alternatively be configured for either serial or parallel data in either analog or digital format. Data channels 681 through 688 carry the subject set of R data values from the individual subregisters 601 through 608 to the "A" inputs of multiplexer 630.

4. Recirculatory Subarray

As indicated previously, FIG. 6 presents an example mechanization for an apparatus whose purpose is to order, as a function of magnitude, a set of R applied data signals, where R is an even number, and where the ordering is accomplished in a plurality of iterative operating cycles. Because the example network is configured to process a data set having 8 elements, R=8 for this depicted mechanization.

A key feature of the example mechanization is a plurality of Number Pair Orderers (NPO's). The nature of the NPO's used in FIG. 6 is the same as that of those utilized in the Figures-1 and 2 mechanizations and presented and described in detail in conjunction with those FIGS. The applicable descriptive comments made in conjunction with the explanation of FIGS. 1 and 2 are, therefore, here incorporated by reference. In particular, with reference to the example lettering at NPO 611 in FIG. 6, each of the NPO's has a first input "a" and a second input "b," and a first output "c" and a second output "d." These devices are internally configured so as to compare the magnitude of a signal presented at the first "a" input with the magnitude of a signal presented at the second "b" input, and thereafter transmit to the predetermined first output "c" that input signal having the smaller relative magnitude, while transmitting to the predetermined other second output "d" that input signal having the greater relative magnitude.

The individual NPO's of the recirculating network are arranged into two groups. The number of NPO's in each group is a function of the size of the set of applied data signals. In the FIG. 6 case of a network which is configured for processing an even number R of applied data signals, the first and second NPO groups have $((R/2)-1)$ and $(R/2)$ ordering devices respectively. These two groups appear in FIG. 6 as a first "partial-pair" NPO group having NPO's 611, 613 and 615, and as a second "all-pair" NPO group of NPO's 621, 623, 625 and 627. As an aid in understanding both the interaction between the groups as well as their relationship to the elements of the data set, the individual NPO's of each group are generally identified as a first through $((R/2)-1)$st NPO, with the second group having an $(R/2)$nd NPO. In the FIG. 6 case where R=8, NPO's 611 and 621 become the "first" NPO's of their respective groups, NPO's 613 and 623 become the respective "second" NPO's and NPO's 615 and 625 become the respective "third"

A recirculating data bus 690 transmits the data signals back and forth between these first and second groups of NPO's during the plurality of iterative operating cycles required for performing the ordering of the input data. As mechanized, bus 690 includes bus-component channels 691 through 698. Each of these channels in turn generally includes subchannels "a" through "h," as will be further described below.

When contained within this data bus while the ordering is being performed, the data is treated as an intermediate signal set whose individual members are designated as a first through Rth intermediate signal element which in the FIG. 6 example mechanization are respectively carried by bus-component channels 691 through 698.

The ordering network also includes a conventional multiplexer 630 having alternate "A" and "B" inputs, and outputs "C." This multiplexer is configured to receive at its "A" inputs over data channels 681 through 688 the subject set of R, originally-unordered, applied data signals, while receiving at its "B" inputs over databus subchannels 691(e) through 698(e) the intermediate signal set generated at the second NPO group of NPO's 621 through 627. Upon receiving at its output-select input "OS" an appropriate command from conventional control unit 660, the multiplexer passes to its outputs "C" the signals which appear at either of its "A" or "B" inputs. The 660 is configured to cause the "A" input set of the described applied original data signals to pass to the "C" outputs at the start of the ordering process. Upon being transmitted to the "C" outputs, the applied data signals become an initial first through Rth intermediate signal set. Once the ordering process is under way, the control unit is configured to generate an alternate output-select signal which thereafter transmits to outputs "C" the intermediate results of the ordering process as they appear in intermediate-signal-set form at inputs "B."

From the "C" outputs of multiplexer 630, data bus subchannels 691(a) through 698(a) carry the intermediate signal set to a conventional latch 640 where the data is momentarily stored so as to provide a stable reference for immediately-subsequent processing. From latch 640, bus subchannels 692(b) through 697(b) carry the second through (R−1)st members of the intermediate signal set to the first group of NPO's.

The general concept governing the data-NPO interaction at this point of the network is that within the first NPO group, the individual first through ((R/2)-1)st NPO's respectively receive and order the ((R/2)−1) successive, non-overlapping signal pairs formed by pair-wise combining the second through (R−1)st intermediate signals. In the general case of any Jth one of the ((R/2)−1) NPO's, the Jth NPO's first and second inputs respectively receive the (2×J)th and ((2×J)+1)st intermediate signals. The properly-ordered signals transmitted to the first and second outputs of this Jth NPO respectively form the (2×J)th and ((2×J)+1)st elements of a new intermediate signal set. The first and Rth intermediate signal are left unpaired and unordered by this first group and become the first and Rth elements of the new intermediate signal set.

In the FIG. 6 mechanization of these concepts, the first NPO 611 receives the first pair of intermediate signals, the second NPO 613 receives the second pair, and the third NPO 615 receives the third signal pair. Examining the situation where the general NPO designator J equals 2, it can be seen that the second NPO's first and second inputs respectively receive the fourth and fifth intermediate signals. After the pair-wise ordering of these signals, the signals transmitted to this NPO's first and second outputs respectively form the fourth and fifth elements of the new intermediate signal set which appears on output subchannels 692(c) through 697(c). The first and eighth signal-set elements, carried on subchannels 691(b) and 698(b), are left unordered by this first NPO group and become the first and eighth elements of the new intermediate signal set.

The subchannels 692(c) through 697(c), together with subchannels 691(b) and 698(b), carry the new intermediate signal set to conventional latch 650 where the new set is momentarily stored so as to again provide a stable reference for immediately-subsequent processing. From the output of this latch, subchannels 691(d) through 698(d) carry the new intermediate signal set to the second group of NPO's.

The general concept governing the data-NPO interaction at the second NPO group is that within this second group, the individual first through (R/2)nd NPO's respectively receive and order the (R/2) successive, non-overlapping signal pairs formed by pair-wise combining the first through Rth intermediate signals. In the general case of any Jth one of the (R/2) NPO's, the Jth NPO's first and second inputs respectively receive the ((2×J)−1)st and (2×J)th intermediate signals. The properly-ordered signals transmitted to the first and second outputs of this Jth NPO respectively form the ((2×J)−1)st and (2×J)th elements of a new intermediate signal set.

In the FIG. 6 mechanization of these concepts, the first NPO 621 receives the first pair of intermediate signals, the second NPO 623 receives the second pair, the third NPO 625 receives the third signal pair and the fourth NPO 627 receives the fourth signal pair. Examining the situation where the general NPO designator J equals 2, it can be seen that the second NPO's first and second inputs respectively receive the third and fourth intermediate signals. After the pair-wise ordering of these signals, the signals transmitted to this NPO's first and second outputs respectively form the third and fourth elements of the new intermediate signal set which appears on output subchannels 691(e) through 698(e).

The subchannels 691(e) through 698(e) carry the new intermediate signal set back to the "B" inputs of multiplexer 630, at which point the now partially-ordered data is ready for the next ordering iteration. From the (e) subchannel outputs of the second NPO group, all set members are carried by output subchannels 691(h) through 698(h) to conventional output multiplexer 670. As further explained below, after an appropriate number of ordering iterations, control unit 660 generates on channel 674 an output-enable command "OE" which upon being received by multiplexer 670 permits any one of the multiplexer's R input signals to be transmitted from the network on output channel 679 as a desired Mth-largest output from the overall system.

Control unit 660 sends out over timing bus 675 the set "T" of conventional timing control signals required to cause the data to circulate around the loop during the ordering process. The individual timing elements of the set "T" are received at the individual array devices by means of conventional connections not shown. As it is considered to be readily apparent to those skilled in the art that the design of such timing signals would be a relatively straightforward task, a detailed description of an example set of such timing signals will be dispensed with. It is believed sufficient to state that the timing signals are sequenced so that the data is subjected to a total of R group orderings before the output enable signal "OE" is generated. This requirement is in accordance with the general theory of sorting operation apparent from the network of FIG. 1 and from the previously-cited teachings of Knuth, where the data is properly ordered after having passed through R levels of ordering. In the FIG. 6 network, the data will have experienced the required R orderings after having passed (R/2) times through both NPO groups. Thus, the output new ntermediate signal set from the second group becomes the properly-ordered desired magnitude sequence after the (R/2)nd cycle of data signals through this second group. Because the data is properly ordered after this cycle, further orderings are unnecessary, and the output multiplexer is attached after both the first and second NPO groups. This is once again in contradistinction to the networks of FIGS. 3 and 4 where the output appears, after an appropriate number of orderings, at the output of the first NPO group.

D. Relative Merits

A comparative disadvantage of the recirculating networks of FIGS. 3, 4, 5 and 6 is that even though they are capable of operating at real-time data rates, they cannot accept a new set of data until the ordering for an "existing" set is completed and the set has exited from the networks+ outputs. This acceptance characteristic can be contrasted with the faster, FIG. 1 apparatus where new data can be received while existing data is still undergoing ordering. However, the recirculating networks represent a significant improvement over the linear network of FIG. 1 in that they require fewer of the hardware-intensive NPO's.

III. Equal-Data Ambiguities

Included within the information incorporated at the beginning of this specification is a discussion, presented in the document entitled "Real-Time Ordinal-Value Filters Utilizing Complete Intra-Data Comparisons," concerning equal-data ambiguities. As explained more fully in that document, the presence of equal data values among the members of a given R-unit data set is considered to give rise to an ambiguity in that the equality creates a discrepancy between the number of magnitudes and the number of signals which the data set contains.

From the standpoint of terminology, such ambiguities are resolved by means of a special definition. In accordance with this definition, expressions such as "Mth-largest" (in the sense of the Mth-largest magnitude) are specially defined as being a designation for that data-set element which would occupy the Mth position in an ordered-by-magnitude listing of the set's data signals. Furthermore, it may be observed that, from the standpoint of device operation, such ambiguities present no significant difficulties for the inventions of the present specification.

IV. Operational Advantages

When the number of R of inputs is odd and M is made equal to the quantity $((R+1)/2)$, the networks of FIGS. 1, 3 and 4 become median filters which output a data value that in general has an equal number of other subject input data values both greater than and less than itself. A special advantage of such a median filter implemented as described in these example mechanizations is its ability to generate the median value at real-time data rates. This is an exceptionally valuable feature in the above-referred-to operational environments such as image processing.

Another advantage is that each of the disclosed networks can easily be adapted, through an application of suitable control means and techniques, both wellknown in the art, to operate iteratively upon a succession of R-unit data sets so as to generate a corresponding sequence of Mth-largest output signals.

V. Claims

The preceeding description has presented in detail merely an exemplary preferred embodiment of each claimed invention. It will be apparent to those skilled in the art that numerous other alternative embodiments encompassing many variations may readily be employed without departing from the spirit and scope of the invention as set forth in the appended claims, in which:

What is claimed is:

1. An apparatus for ordering, as a function of magnitude, a set of R applied data signals, where R is an odd number and where the ordering is accomplished in a plurality of iterative operating cycles, this apparatus comprising:
   (A) a plurality of pair-ordering means, each of said means having a first and second input and a first and second output, each of said means being:
      (1) for comparing the magnitude of a signal presented at the first input with the magnitude of a signal presented at the second input,
      (2) for transmitting to a predetermined one of said first and second outputs that input signal having the smaller relative magnitude, and
      (3) for transmitting to the predetermined other one of said first and second outputs that input signal having the greater relative magnitude;
   (B) said plurality of pair-ordering means being arranged into a first group and a second group, each group having $((R-1)/2)$ ordering means, with the individual ordering means of each group being identified as a first through $((R-1)/2)$nd pair-ordering means;
   (C) data bus means for transmitting data signals back and forth between said first and second pair-ordering groups during said plurality of iterative operating cycles as the ordering is performed;
   (D) said data signals, when on said bus means, forming an intermediate signal set of a first through Rth intermediate signal;
   (E) multiplexer means, responsive to said R, originally-unordered, applied data signals, and receiving over said bus means from said second group said intermediate signal set, said multiplexer means being: for outputting, upon external selective command, either,
      (1) at the start of the ordering process, said applied original data signals as an initial-set first through Rth intermediate signal, or
      (2) after the start of the ordering process, said received intermediate signals;
   (F) said first group receiving, over said bus means, said first through $(R-1)$st intermediate signals from said multiplexer means, said first through $((R-1)/2)$nd individual pair-ordering means of said first group respectively receiving and ordering the $((R-1)/2)$ successive, non-overlapping signal pairs formed by pair-wise combining said first through $(R-1)$st intermediate signals, with the Rth intermediate signal left unpaired and unordered, where for any J from 1 through $((R-1)/2)$, the first and second inputs of the Jth ordering means respectively receive the $((2\times J)-1)$st and $(2\times J)$th intermediate signals, and where the signals transmitted to the first and second outputs of this Jth pair-ordering means respectively form the $((2\times J)-1)$st and $(2\times J)$th elements of a new R-member intermediate signal set whose Rth element is said previous Rth intermediate signal which has been left unpaired and unordered by this first group;
   (G) said second group receiving, over said bus means from said first group, the second through Rth elements of said new intermediate signal set, said first through $((R-1)/2)$nd individual pair-ordering means of said second group respectively receiving and ordering the $((R-1)/2)$ successive, nonoverlapping signal pairs formed by pair-wise combining said second through Rth intermediate signals, with the first intermediate signal left unpaired and unordered, where for any J from 1 through $((R-1)/2)$, the first and second inputs of the Jth ordering means respectively receive the $(2\times J)$th and $((2\times J)+1)$st intermediate signals, and where the signals transmitted to the first and second outputs of this Jth pair-ordering means respectively form the $(2\times J)$th and $((2\times J)+1)$st elements of a new R-member intermediate signal set whose first element is said previous first intermediate signal which has been left unpaired and unordered by this second group;
   (H) the output new intermediate signal set from said first group forming the desired ordered magnitude sequence after the $((R+1)/2)$nd cycle of data signals through said first group.

2. An apparatus for ordering, as a function of magnitude, a set of R applied data signals, where R is an odd number and where the ordering is accomplished in a plurality of iterative operating cycles, this apparatus comprising:
(A) a plurality of pair-ordering means, each of said means having a first and second input and a first and second output, each of said means being:
  (1) for comparing the magnitude of a signal presented at the first input with the magnitude of a signal presented at the second input,
  (2) for transmitting to a predetermined one of said first and second outputs that input signal having the smaller relative magnitude, and
  (3) for transmitting to the predetermined other one of said first and second outputs that input signal having the greater relative magnitude;
(B) said plurality of pair-ordering means being arranged into a first group and a second group, each group having $((R-1)/2)$ ordering means, with the individual ordering means of each group being identified as a first through $((R-1)/2)$nd pair-ordering means;
(C) data bus means for transmitting data signals back and forth between said first and second pair-ordering groups during said plurality of iterative operating cycles as the ordering is performed; signals, when on said bus means,
(D) said data forming an intermediate signal set of a first through Rth intermediate signal;
(E) multiplexer means, responsive to said R, originally-unordered, applied data signals, and receiving over said bus means from said second group said intermediate signal set, said multiplexer means being: for outputting, upon external selective command, either,
  (1) at the start of the ordering process, said applied original data signals as an initial-set first through Rth intermediate signal, or
  (2) after the start of the ordering process, said received intermediate signals;
(F) said first group receiving, over said bus means, said second through Rth intermediate signals from said multiplexer means, said first through $((R-1)/2)$nd individual pair-ordering means of said first group respectively receiving and ordering the $((R-1)/2)$ successive, non-overlapping signal pairs formed by pair-wise combining said second through Rth intermediate signals, with the first intermediate signal left unpaired and unordered, where for any J from 1 through $((R-1)/2)$, the first and second inputs of the Jth ordering means respectively receive the $(2\times J)$th and $((2\times J)+1)$st intermediate signals, and where the signals transmitted to the first and second outputs of this Jth pair-ordering means respectively form the $(2\times J)$th and $((2\times J)+1)$st elements of a new R-member intermediate signal set whose first element is said previous first intermediate signal which has been left unpaired and unordered by this first group;
(G) said second group receiving, over said bus means from said first group, the first through $(R-1)$st elements of said new intermediate signal set, said first through $((R-1)/2)$nd individual pair-ordering means of said second group respectively receiving and ordering the $((R-1)/2)$ successive, nonoverlapping signal pairs formed by pair-wise combining said first through $(R-1)$st intermediate signals, with the Rth intermediate signal left unpaired and unordered, where for any J from 1 through $((R-1)/2)$, the first and second inputs of the Jth ordering means respectively receive the $((2\times J)-1)$st and $(2\times J)$th intermediate signals, and where the signals transmitted to the first and second outputs of this Jth pair-ordering means respectively form the $((2\times J)-1)$st and $(2\times J)$th elements of a new R-member intermediate signal set whose Rth element is said previous Rth intermediate signal which has been left unpaired and unordered by this second group;
(H) the output new intermediate signal set from said first group forming the desired ordered magnitude sequence after the $((R+1)/2)$nd cycle of data signals through said first group.

3. An apparatus for ordering, as a function of magnitude, a set of R applied data signals, where R is an even number and where the ordering is accomplished in a plurality of iterative operating cycles, this apparatus comprising:
(A) a plurality of pair-ordering means, each of said means having a first and second input and a first and second output, each of said means being:
  (1) for comparing the magnitude of a signal presented at the first input with the magnitude of a signal presented at the second input,
  (2) for transmitting to a predetermined one of said first and second outputs that input signal having the smaller relative magnitude, and
  (3) for transmitting to the predetermined other one of said first and second outputs that input signal having the greater relative magnitude;
(B) said plurality of pair-ordering means being arranged into a first group and a second group, said first group having $(R/2)$ ordering means, these ordering means being identified as a first through $(R/2)$nd pair-ordering means, and said second group having $((R/2)-1)$ ordering means, these means being identified as a first through $((R/2)-1)$st pair-ordering means;
(C) data bus means for transmitting data signals back and forth between said first and second pair-ordering groups during said plurality of iterative operating cycles as the ordering is performed;
(D) said data signals, when on said bus means, forming an intermediate signal set of a first through Rth intermediate signal;
(E) multiplexer means, responsive to said R, originally-unordered, applied data signals, and receiving over said bus means from said second group said intermediate signal set, said multiplexer means being: for outputting, upon external selective command, either,
  (1) at the start of the ordering process, said applied original data signals as an initial-set first through Rth intermediate signal, or cess, said received intermediate signals;
(F) said first group receiving, over said bus means, said first through Rth intermediate signals from said multiplexer means, said first through $(R/2)$nd individual pair-ordering means of said first group respectively receiving and ordering the $(R/2)$ successive, non-overlapping signal pairs formed by pair-wise combining said first through Rth intermediate signals, where for any J from 1 through $(R/2)$, the first and second inputs of the Jth ordering means respectively receive the $((2\times J)-1)$st and $(2\times J)$th intermediate signals, and where the signals transmitted to the first and second outputs of this Jth pair-ordering means respectively form the $((2\times J)-1)$st and $(2\times J)$th elements of a new R-member intermediate signal set;

(G) said second group receiving, over said bus means from said first group, the second through $(R-1)$st elements of said new intermediate signal set, said first through $((R/2)-1)$st individual pair-ordering means of said second group respectively receiving and ordering the successive, non-overlapping signal pairs formed by pair-wise combining said second through $(R-1)$st intermediate signals, with the first and Rth intermediate signals left unpaired and unordered, where for any J from 1 through $((R/2)-1)$, the first and second inputs of the Jth ordering means respectively receive the $(2\times J)$th and $((2\times J)+1)$st intermediate signals, and where the signals transmitted to the first and second outputs of this Jth pair-ordering means respectively form the $(2\times J)$th and $((2\times J)+1)$st elements of a new R-member intermediate signal set whose first and Rth elements are said previous first and Rth intermediate signals which have been left unpaired and unordered by this second group;

(H) the output new intermediate signal set from said second group forming the desired ordered magnitude sequence after the (R/2)nd cycle of data signals through said second group.

4. An apparatus for ordering, as a function of magnitude, a set of R applied data signals, where R is an even number and where the ordering is accomplished in a plurality of iterative operating cycles, this apparatus comprising:

(A) a plurality of pair-ordering means, each of said means having a first and second input and a first and second output, each of said means being:
 (1) for comparing the magnitude of a signal presented at the first input with the magnitude of a signal presented at the second input,
 (2) for transmitting to a predetermined one of said first and second outputs that input signal having the smaller relative magnitude, and
 (3) for transmitting to the predetermined other one of said first and second outputs that input signal having the greater relative magnitude;

(B) said plurality of pair-ordering means being arranged into a first group and a second group, said first group having $((R/2)-1)$ ordering means, these ordering means being identified as a first through $((R/2)-1)$st pair-ordering means, and said second group having $(R/2)$ ordering means, these ordering means being identified as a first through $(R/2)$nd pair-ordering means; signals back and forth between said first and second pair-ordering groups during said plurality of iterative operating cycles as the ordering is performed;

(D) said data signals, when on said bus means, forming an intermediate signal set of a first through Rth intermediate signal;

(E) multiplexer means, responsive to said R, originally-unordered, applied data signals, and receiving over said bus means from said second group said intermediate signal set, said multiplexer means being: for outputting, upon external selective command, either,
 (1) at the start of the ordering process, said applied original data signals as an initial-set first through Rth intermediate signal, or
 (2) after the start of the ordering process, said received intermediate signals;

(F) said first group receiving, over said bus means, said second through $(R-1)$st intermediate signals from said multiplexer means, said first through $((R/2)-1)$st individual pair-ordering means of said first group respectively receiving and ordering the $((R/2)-1)$ successive, non-overlapping signal pairs formed by pair-wise combining said second through $(R-1)$st intermediate signals, with both the first and Rth intermediate signals left unpaired and unordered, where for any J from 1 through $((R/2)-1)$, the first and second inputs of the Jth ordering means respectively receive the $(2\times J)$th and $((2\times J)+1)$-st intermediate signals, and where the signals transmitted to the first and second outputs of this Jth pair-ordering means respectively form the $(2\times J)$th and $((2\times J)+1)$st elements of a new R-member intermediate signal set whose first and Rth elements are said previous first and Rth intermediate signals which have been left unpaired and unordered by this first group;

(G) said second group receiving, over said bus means from said first group, the first through Rth elements of said new intermediate signal set, said first through R/2)nd individual pair-ordering means of said second group respectively receiving and ordering the (R/2) successive, nonoverlapping signal pairs formed by pair-wise combining said first through Rth intermediate signals, where for any J from 1 through (R/2), the first and second inputs of the Jth ordering means respectively receive the $((2\times J)-1)$st and $(2\times J)$th intermediate signals, and where the signals transmitted to the first and second outputs of this Jth pair-ordering means respectively form the $((2\times J)-1)$st and $(2\times J)$th elements of a new R-member intermediate signal set; output new intermediate signal set (H) the from said second group forming the desired ordered magnitude sequence after the (R/2)nd cycle of data signals through said second group.

5. An apparatus according to any one of claims 1, 2, 3 or 4 in which each of said pair-ordering means includes:

(A) comparator means, responsive both to signals presented at said first input and to signals presented at said second input,
 (1) for performing said relative magnitude comparison, and
 (2) for generating an output-select signal indicative which of said first or second input signals is larger;

(B) first multiplexer means, also responsive to both the signals presented at said first input and the signals presented at said second input, and responsive to said output-select signal, for transmitting to said predetermined one of said first and second outputs the smaller of the input signals, by so transmitting the first input signal when said select signal indicates that the magnitude of said second signal is larger than or equal to the magnitude of said first signal, or by so transmitting said second signal when said select signal indicates that said first input signal is larger than said second input signal; and (C) second multiplexer means, also responsive both to the signals presented at said first input and to the signals presented at said second input, and responsive to said output-select signal, for transmitting to said predetermined other one of said first and second second outputs the larger of the input signals, by so transmitting the first input signal when said select signal indicates that said first signal is larger than said second signal, or by so transmitting said second signal when said select signal indicates that said second input signal is larger than or equal to said first input signal.

* * * * *